United States Patent Office 3,035,028
Patented May 15, 1962

3,035,028
ALKENYLATED LINEAR POLYAMIDES
Charles E. Wheelock, Bartlesville, Okla., assignor to Phillips Petroleum Company, a corporation of Delaware
No Drawing. Filed Dec. 18, 1957, Ser. No. 703,504
3 Claims. (Cl. 260—78)

This invention relates to alkenylated linear polyamides. In one aspect the invention relates to alkenylated linear polyamides made by adding alkenyl groups to linear polyamides having only one hydrogen attached to each nitrogen of the polyamide.

It is an object of the invention to modify the properties of linear polyamides. It is a further object of the invention to produce linear polyamides having substituents containing olefinic unsaturation. Other objects, as well as aspects and advantages of the invention, will become apparent from the accompanying disclosure.

According to the invention new compositions of matter are produced from linear polyamides containing a single hydrogen on the nitrogen in the amide groups by alkenylating such polyamides, the added alkenyl groups containing from two to 20 carbon atoms, preferably from 2 to 10 carbon atoms, in each alkenyl radical.

The invention is particularly applicable to synthetic linear polyamides. Such polyamides can be obtained by well known methods, such as self-polymerization of a monoaminomonocarboxylic acid or by reacting a diamine with a dicarboxylic acid in substantially equimolar amounts. The term polyamide is also inclusive of the polyester-polyamides such as those obtained by reacting a monoaminomonohydric alcohol with a dicarboxylic acid in substantially equimolar amounts or by admixture of other linear polymer-forming reactants such as glycol-dibasic acid mixtures or hydroxy acids, with the aforementioned polyamide-forming reactants. The average number of carbon atoms separating the amide groups in these polyamides is usually at least 2 and preferably at least 5. The invention is also applicable to natural polyamides such as wool and similar animal fibers.

The alkenylated polyamides of this invention are produced from the linear polyamides hereinbefore described by different methods. The introduction of a vinyl group can be accomplished by reaction of a polyamide with acetylene in a closed system at elevated temperatures in the presence of strongly alkaline catalyst such as alkali metal hydroxides and alcoholates, for instance sodium hydroxide or sodium ethylate. Temperatures of 100–200° C. are generally satisfactory for this reaction. The amount of acetylene used will depend, at least in part, upon the proportion of hydrogen radicals it is desired to replace. Thus, it is believed that the alkenyl groups replace a hydrogen on the nitrogen of an amide group. When alkyl acetylenes are used instead of acetylene, higher alkenylated polyamides are produced. The same process can be employed to add other alkenyl groups employing instead of acetylene an alkyl acetylene containing from 3 to 20, preferably from 3 to 10 carbon atoms per molecule. Examples of such alkyl acetylenes include methylacetylene; ethylacetylene; dimethylacetylene; 1-pentyne; 2-pentyne; 3-methyl-1-butyne; 1-hexyne; 2-hexyne; 3-hexyne; 3,3-dimethyl-1-butyne; 1-octadecyne; 2,3-dimethyl-4-octadecyne, and 3-methyl-1-butyne.

Alkenylated polyamides other than vinylated polyamides can be conveniently prepared by treating the linear polyamide first with an alkali metal such as sodium or potassium to replace the desired number of hydrogen atoms on the nitrogen and then reacting this material with an alkenyl halide, e.g., allyl chloride, bromide, or iodide. The reaction is generally effected in the presence of a solvent. Dimethyl formamide is a suitable solvent for this reaction, in the case of synthetic linear polyamides. Temperatures satisfactory for the alkenylation of polyamides range from 35–150° C. The alkenyl halides employed are usually those having from 3 to 20 carbon atoms, preferably from 3 to 10 carbon atoms. Other examples of such alkenyl halides include: 3-bromo-1-butene; 4-chloro-1-butene; 5-chloro-1-pentene; 4-bromo-2-pentene; 5-iodo-1-hexene; 2-methyl-4-chloro-1-butene; 1-bromo-3-octene; 4,5'-dimethyl-3-bromo-1-hexene; 10-chloro-1-decene; 3-iodo-1-decene; 3,6-dimethyl-1-bromo-4-octene; 6-bromo-4-dodecene; 7-chloro-9-octadecene; 8,11-dimethyl-1-chloro-9-octadecene and 3-chloro-1-tetradecene.

The alkenylated polyamides of this invention when heated undergo cross-linking to yield thermoset products. The synthetic linear polyamides which have been alkenylated according to the invention are useful in molding, coating, casting, laminating, and potting compositions. Catalysts and/or promoters can be used to aid in the curing or thermosetting step. A permanent cure or kink can be imparted to nylon fiber by alkenylating, preferably vinylating, it and then effecting cross-linking while it is in a twisted condition. By the alkenylation step of the invention natural fibers can be modified and rendered more suitable for use in fabrics, e.g., wool can be alkenylated and cross-linked at an appropriate time to render the material more crease resistant or more likely to retain an iron crease than untreated fiber or fabric.

*Example I*

A synthetic linear polyamide (condensation product of hexamethylene diamine and dibasic acid) was reacted with allyl bromide to give the alkenylated product. Properties of the unreacted polyamide were:

Flexural strength, 73° F., lbs./sq. in. (D790–49T) _ 1000
Compressive stress at 1% deformation, lbs./sq. in.
  (D695–49T) _____ 800
Shear strength, lbs./sq. in. (D732–46) _____ 5700
Elongation, 73° F., percent (D638–49T) _____ 300

A mixture of 100 grams of the polyamide and 2500 ml. of dimethyl formamide was prepared and dried by distilling 500 ml. of the dimethyl formamide under vacuum. To the warm (90° C.) stirred solution was added 7.4 grams of sodium which had been cut into small pieces. The temperature rose to 125° C. and a dark, gummy mass formed which disintegrated after stirring the mixture for two hours. During this period, the temperature ranged from 90 to 125° C. The temperature was allowed to drop 45° C. and the mixture assumed the consistency of a thick, paste-like material. Over a period of 10 minutes, 75 ml. of allyl bromide (previously dried over anhydrous sodium sulfate) was added, with stirring. The reaction mixture was allowed to stand overnight (approximately 15 hours) without stirring after which it was stirred and warmed for 30 minutes (maximum temperature, 60° C.). The solution was a light orange color and was neutral. Heating and stirring were continued for 1.5 hours longer. The organic solids were fully soluble while the original polyamide could not be dissolved completely until the temperature reached 90° C. The product was worked up by pouring the dimethyl formamide solution, 400 ml. at a time, into 2000 ml. of distilled water and then stirring the mixture in a Waring Blendor for 10 minutes. The precipitate was collected on a Büchner funnel, washed thoroughly with water, and dried in a vacuum desiccator.

A portion of the alkenylated product and also some of the original polyamide were heated with distilled water, and some of each aqueous solution was cooled and treated with a dilute aqueous solution of potassium permanganate.

The fluid from the alkenylated product decolorized the permanganate immediately, while the permanganate color remained for over a day in the fluid from polyamide. To eliminate the possibility of volatile materials causing a positive reaction to the permanganate test, a portion of the alkenylated product was held at room temperature at 0.00002 mm. for 3.5 hours and the permanganate test was again made. Again it was positive, thus showing the modified polymer to be unsaturated.

Samples of the allylated polyamide and untreated polyamide were heated at 165° C. for 5 days. At the end of this period the allylated polyamide sample was thermoset and the polyamide sample was still fluid. The samples were cooled to room temperature and the Shore D hardness (ASTM D676–55T) determined. Results were as follows:

Polyamide _____ 67
Allylated polyamide _____ 74

Portions (0.2 gram each) of the heated polyamide, the heated (thermoset) allylated polyamide, and the unheated allylated polyamide were placed in formic acid (10 ml., 85 percent) for a long period at room temperature. The unheated allylated polyamide and the heated polyamide dissolved completely in a short time. The heated (thermoset) allylated polyamide did not dissolve in two weeks.

Example II

Thirty grams of zein (from corn, technical grade) and 1500 ml. of dimethyl formamide were heated under a short Vigreaux column and about 300 ml. of the solvent was distilled under vacuum to dry the system. Five grams of sodium shavings was added gradually, with stirring. The sodium dissolved and a black, gummy mass precipitated which did not dissolve when the mixture was heated at 80–100° C. Fifty ml. of allyl bromide, previously dried over anhydrous sodium sulfate, was added gradually, with stirring and stirring was continued until the mixture was no longer alkaline to litmus paper. The organic material was soluble in the dimethyl formamide but the sodium bromide, formed during the reaction, was present as a precipitate. The mixture was filtered and the alkenylated product was recovered from the filtrate by the addition of water while stirring the mixture. The alkenylated product, in the form of a gummy mass, settled, the supernatant liquid was decanted, and the product was washed with water. The gummy material was taken up in pyridine and the product was reprecipitated by the addition of water. It settled slowly and was separated by filtration and dried over calcium chloride in a vacuum desiccator. A light colored solid was obtained.

Hydrochloric acid was added to the filtrate and more precipitate was formed from the pyridine-water solution. This material was separated and dried in the manner described for the first crop of precipitate.

Samples of each crop of precipitate and also the original zein were boiled with distilled water, cooled, and dilute aqueous potassium permanganate solution was added to a portion of each aqueous solution. The test specimen obtained from the HCl-precipitated product decolorized permanganate rapidly while that from zein and the first crop of precipitate reacted very slowly.

As will be evident to those skilled in the art, various modifications of this invention can be made or followed in the light of the foregoing disclosure and discussion without departing from the spirit or scope of the disclosure or from the scope of the claims.

I claim:
1. An alkenylated modified linear polycarbonamide produced by reacting a linear polycarbonamide having a hydrogen directly bonded to the amide nitrogen first with an alkali metal, and then with an alkenyl halide having 3 to 20 carbon atoms per molecule, said modified linear polycarbonamide characterized by its decoloration of dilute aqueous potassium permanganate when treated therewith.

2. An alkenylated modified linear polycarbonamide according to claim 1 wherein said alkali metal is selected from the group consisting of sodium and potassium.

3. Modified zein produced by reacting zein first with sodium and then with allyl bromide, said modified zein characterized by its decoloration of dilute aqueous potassium permanganate when treated therewith.

References Cited in the file of this patent
UNITED STATES PATENTS

| | | |
|---|---|---|
| 2,451,672 | Gray | Oct. 19, 1948 |
| 2,579,871 | Schoene | Dec. 25, 1951 |
| 2,805,215 | Caldwell et al. | Sept. 3, 1957 |
| 2,808,331 | Unruh et al. | Oct. 1, 1957 |

FOREIGN PATENTS

| | | |
|---|---|---|
| 114,419 | Sweden | July 3, 1945 |

OTHER REFERENCES

Hechelhammer et al.: German application, F9661 IVb/39C, April 26, 1956.

Shriner et al.: The Systematic Identification of Organic Compounds, 4th Ed., 1956, pages 133–136, pub. by John Wiley & Sons, Inc., New York, N.Y.